(12) United States Patent
Varma et al.

(10) Patent No.: US 9,405,351 B2
(45) Date of Patent: Aug. 2, 2016

(54) PERFORMING FREQUENCY COORDINATION IN A MULTIPROCESSOR SYSTEM

(71) Applicant: Intel Corporation, Santa Clara, CA (US)

(72) Inventors: Ankush Varma, Hillsboro, OR (US); Krishnakanth V. Sistla, Beaverton, OR (US); Ian M. Steiner, Hillsboro, OR (US); Vivek Garg, Folsom, CA (US); Chris Poirier, Fort Collins, CO (US); Martin T. Rowland, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 617 days.

(21) Appl. No.: 13/716,712

(22) Filed: Dec. 17, 2012

(65) Prior Publication Data

US 2014/0173297 A1     Jun. 19, 2014

(51) Int. Cl.

| G06F 1/26 | (2006.01) |
|---|---|
| G06F 1/32 | (2006.01) |
| G06T 1/20 | (2006.01) |
| G06F 13/00 | (2006.01) |
| G06F 9/50 | (2006.01) |
| G06F 15/173 | (2006.01) |

(52) U.S. Cl.
CPC . *G06F 1/324* (2013.01); *G06F 1/32* (2013.01); *G06F 1/3203* (2013.01); *G06F 1/329* (2013.01); *G06F 9/505* (2013.01); *G06F 9/5044* (2013.01); *G06F 13/00* (2013.01); *G06F 15/17325* (2013.01); *G06T 1/20* (2013.01); *Y02B 60/1217* (2013.01)

(58) Field of Classification Search
CPC ......... G06F 1/32; G06F 1/3203; G06F 1/324; G06F 9/5044; G06F 9/505; G06F 13/00; G06F 15/17325; G06T 1/20
USPC .................................. 713/300, 320, 323, 324
See application file for complete search history.

(56) References Cited

U.S. PATENT DOCUMENTS

| 5,163,153 A | 11/1992 | Cole et al. |
|---|---|---|
| 5,522,087 A | 5/1996 | Hsiang |
| 5,590,341 A | 12/1996 | Matter |
| 5,621,250 A | 4/1997 | Kim |

(Continued)

FOREIGN PATENT DOCUMENTS

EP     1 282 030 A1     5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Michael J Brown
(74) *Attorney, Agent, or Firm* — Trop, Pruner & Hu, P.C.

(57) ABSTRACT

In an embodiment, a processor includes a core to execute instructions, uncore logic coupled to the core, and a power controller to control a power consumption level. The power controller is configured to determine an activity level of the processor and responsive to this level, to generate a request for communication to a second processor coupled to the processor to request frequency coordination between the processors. Other embodiments are described and claimed.

19 Claims, 7 Drawing Sheets

(56) References Cited

U.S. PATENT DOCUMENTS

| | | |
|---|---|---|
| 5,931,950 A | 8/1999 | Hsu |
| 6,449,291 B1 | 9/2002 | Burns et al. |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 8,732,308 B1 | 5/2014 | Talwar et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0019777 A1* | 1/2004 | Wygant .................. G06F 9/544 713/1 |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0166033 A1 | 7/2005 | Rojit |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0080508 A1 | 4/2006 | Hoover et al. |
| 2006/0080512 A1 | 4/2006 | Hoover et al. |
| 2006/0117202 A1 | 6/2006 | Magklis et al. |
| 2006/0179244 A1 | 8/2006 | Goodman et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156370 A1* | 7/2007 | White et al. .................. 702/132 |
| 2007/0156992 A1 | 7/2007 | Jahagirdar |
| 2007/0180279 A1 | 8/2007 | Sullam |
| 2007/0214342 A1 | 9/2007 | Newburn |
| 2007/0239398 A1 | 10/2007 | Song et al. |
| 2007/0245163 A1 | 10/2007 | Lu et al. |
| 2008/0005485 A1 | 1/2008 | Gilbert et al. |
| 2008/0028240 A1 | 1/2008 | Arai et al. |
| 2008/0148027 A1 | 6/2008 | Fenger et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0099397 A1 | 4/2011 | Rotem et al. |
| 2011/0138212 A1 | 6/2011 | Zagacki |
| 2011/0154090 A1 | 6/2011 | Dixon et al. |
| 2012/0079290 A1 | 3/2012 | Kumar et al. |
| 2012/0246506 A1 | 9/2012 | Knight |
| 2013/0111236 A1* | 5/2013 | Ananthakrishnan et al. . 713/320 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling For Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies For Kalman Filtering and Smoothing," 1996, pp. 1-21.

R.E. Kalman, "A New Approach To Linear Filtering and Prediction Problems," 1960, pp. 1-12.

International Application No. PCT/US2012/028865, filed Mar. 13, 2012, entitled "Providing Efficient Turbo Operation Of A Processor," by Intel Corporation.

International Application No. PCT/US2012/028902, filed Mar. 13, 2012, entitled "Dynamically Controlling Interconnect Frequency In A Processor," by Intel Corporation.

International Application No. PCT/US2012/028876, filed Mar. 13, 2012, entitled "Dynamically Computing an Electrical Design Point (EDP) For A Multicore Processor," by Intel Corporation.

U.S. Appl. No. 13/247,564, filed Sep. 28, 2011, entitled, "Estimating Temperature Of A Processor Core In A Low Power State ", by Avinash N. Ananthakrishnan, et al.

U.S. Appl. No. 13/282,896, filed Oct. 27, 2011, entitled, "Enabling A Non-Core Domain To Control Memory Bandwidth ", by Avinash N. Ananthakrishnan, et al.

U.S. Appl. No. 13/282,947, filed Oct. 27, 2011, entitled, "Controlling Operating Frequency Of A Core Domain Via A Non-Core Domain Of A Multi-Domain Processor ", by Avinash N. Ananthakrishnan, et al.

U.S. Appl. No. 13/285,414, filed Oct. 31, 2011, entitled, "Controlling A Turbo Mode Frequency Of A Processor," by Avinash N. Ananthakrishnan, et al.

U.S. Appl. No. 13/247,580, filed Sep. 28, 2011, entitled, "Controlling Temperature Of Multiple Domains Of A Multi-Domain Processor," by Avinash N. Ananthakrishnan, et al.

U.S. Appl. No. 13/285,465, filed Oct. 31, 2011, entitled, "Dynamically Controlling Cache Size To Maximize Energy Efficiency," by Avinash N. Ananthakrishnan, et al.

U.S. Appl. No. 13/225,677, filed Sep. 6, 2011, entitled, "Dynamically Allocating A Power Budget Over Multiple Domains Of A Processor," by Avinash N. Ananthakrishnan, et al.

U.S. Appl. No. 13/600,568, filed Aug. 31, 2012, entitled, "Configuring Power Management Functionality In A Processor," by Malini K. Bhandaru, et al.

International Searching Authority, "Notification of Transmittal of the International Search Report and the Written Opinion of the International Searching Authority," mailed Oct. 28, 2013, in International application No. PCT/US2013/048075.

U.S. Appl. No. 13/716,801, filed Dec. 17, 2012, entitled "Performing Frequency Coordination In A Multiprocessor System Based On Response Timing Optimization," by Ankush Varma, et al.

U.S. Patent and Trademark Office, Office Action mailed Jul. 1, 2015 and Reply Sep. 28, 2015 in U.S. Appl. No. 13/716,801.

* cited by examiner

PERFORMING FREQUENCY COORDINATION IN A MULTIPROCESSOR SYSTEM

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In a multiprocessor system, latency of an access to a remote processor is determined by the remote processor's frequency, more specifically a frequency of a non-core portion of the processor, often referred to as an uncore. Standard power management features reduce uncore frequency when cores are inactive. This creates a scenario such that when cores of one processor seek to access another processor and the remote processor has idle/inactive cores (and thus low uncore frequency), this low remote frequency will cause an increase in the response time. While the remote processor can maintain a fixed frequency for this uncore frequency, this can increase power consumption and still may not resolve the problem of high latency, particularly in low bandwidth workloads.

DETAILED DESCRIPTION

In various embodiments, a mechanism is provided to cause a remote processor to increase its uncore frequency when a local processor is executing a workload that is subject to an undesired latency due to the remote processor. These processors may be respective processor sockets of a multiprocessor system such as a given personal computer, server computer or other computing device. A detection mechanism is provided to determine processor activity, and an inter-processor communication protocol may be used to provide communication regarding frequency coordination. Note that as described herein, this frequency coordination may take different forms, including a situation in which the frequency of non-core circuitry, also referred to herein as system agent or so-called uncore circuitry, is set at a common frequency across multiple processor sockets. In other situations, this frequency coordination may take the form of a request from one processor socket to another socket (or sockets) to seek an update to the uncore frequency, to improve latency of inter-processor communication. Furthermore, understand that while implementations described herein are with regard to processor sockets that can operate at independent frequencies for different domains including an uncore domain, embodiments apply equally to processors that operate at a single frequency. Furthermore, while described herein as performing frequency coordination with regard to uncore frequency, in some embodiments this frequency coordination may be for additional or different components of a processor socket, such as an interconnect frequency in an implementation in which an interconnect frequency such as a ring interconnect of a processor socket operates at a different frequency than an uncore circuit.

Embodiments further provide a frequency floor to be set with regard to the uncore of the remote processor. In operation, when one processor has sufficient activity, it indicates this fact to other processors of a system and requests them to raise their uncore frequency to improve system performance and response times. Although the scope of the present invention is not limited in this regard, uncore frequency coordination control as described herein can be implemented via firmware, hardware, software, and combinations thereof, to thus enable detection of an undesired latency, communication of a request to at least one other processor socket to enable an increased uncore frequency to reduce the latency.

Figure 1:
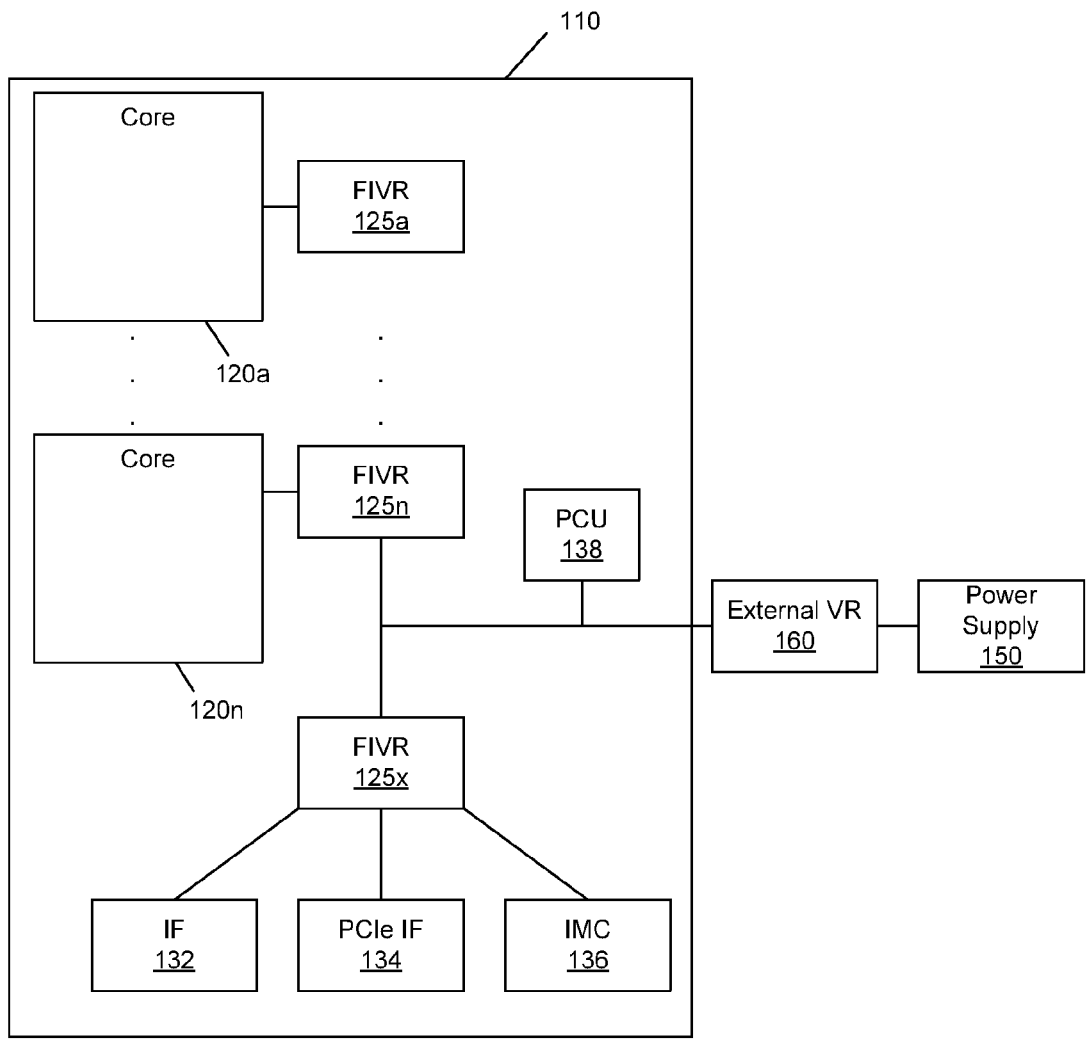
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores $120_a$-$120_n$. In addition, each core may be associated with an individual voltage regulator $125_a$-$125_n$. Accordingly, a fully integrated voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. As will be described herein via one or more QPI interfaces, uncore frequency coordination messages may be communicated between processor sockets of a multiprocessor system. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform uncore frequency control in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 110 such as additional uncore logic and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the uncore frequency control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Note that as more cores of a processor socket enter into deeper low power states, the activity level of the processor reduces and accordingly, so too may the uncore frequency, according to certain power management features of the processor such as implemented via the PCU.

In an embodiment, each processor is configured to detect whether it has sufficient activity to justify triggering a frequency coordination communication to the other processor(s). Various performance metrics can be used as an indicator of sufficient activity, and a processor may use any one or a combination of these metrics. Although the scope of the present invention is not limited in this regard, in an embodiment these metrics include: uncore frequency greater than a specified threshold; maximum frequency of any core greater than a specified threshold; number of cores higher than a given performance state (such a P-state in accordance with the ACPI specification, e.g., a P1 state or maximum guaranteed performance state) exceeds a threshold; and/or mean frequency of active cores exceeds a threshold. Although described with these particular examples, understand the scope of the present invention is not limited in this regard and different metrics or combinations of metrics to indicate a sufficient activity level of a processor may be used in other embodiments.

In an embodiment, a dedicated communication protocol is provided for inter-processor frequency coordination. When the low remote processor frequency control feature is triggered in a processor, one or more messages according to this protocol are sent over an inter-processor interconnect (such as a QPI link or other point-to-point (PtP) interconnect that couples different processor sockets of a multiprocessor system). This message thus provides signaling that a processor has detected a condition that indicates inter-processor frequency coordination (and, optionally, the frequency it is requesting). In different embodiments, this communication protocol may be implemented in either a peer-to-peer manner (where each processor has the same behavior and sends requests to all other processors when it seeks frequency coordination), or in a master-slave manner (where a processor is designated as master and collects information from other processors, makes a decision, and sends requests to all other processors). In either case, the system behavior is the same.

When a processor receives a request from another processor, each processor applies a floor threshold to its uncore frequency and tries to ensure that the uncore frequency is above that floor, provided that power/thermal constraints can be satisfied. The choice of what floor threshold to apply can be implicit (where the processor causes the uncore frequency to transition to a pre-programmed floor frequency, such as a P1 frequency), explicit (where the processor selects the floor frequency based on the request from the other processor), or internally-calculated (where the processor selects the maximum of requests received from other processors and selects the floor frequency based on this maximum). Note that this programmable control is more power conservative than setting an uncore frequency floor via a configuration storage such as a machine specific register (MSR) that is programmed (e.g., through BIOS or a software driver) to cause an uncore to always operate at a high uncore frequency. While this static approach may achieve performance goals, it has a significant power cost, typically 5-10 Watts per processor, that is consumed even when all processors are idle and a high uncore frequency is not needed.

In an embodiment, the processor may be configured to selected a floor frequency that is deadlock-free. For example, setting the floor frequency to a maximum of the uncore frequencies of all the other processors would lead to a deadlock scenario where no processor could reduce its uncore frequency, thus adversely affecting power savings. A corresponding deadlock-free example is to select a floor frequency that is less than a maximum of the uncore frequencies of all the other processors by a predetermined amount (such as 1 or 2 bin frequencies (where a bin frequency is 100 megahertz (MHz), in an embodiment)). In this way, processors may be allowed to reduce frequency as workload behavior changes.

Figure 2:
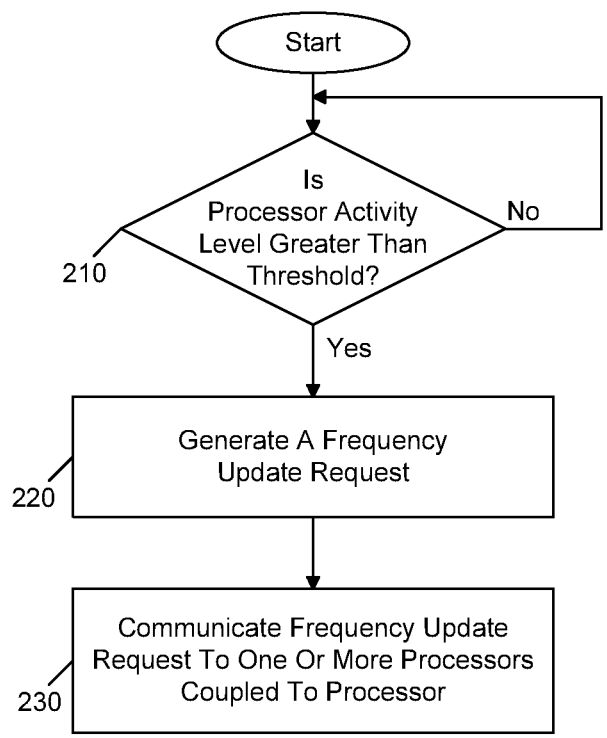
FIG. 2 is a flow diagram of a method for requesting frequency coordination in accordance with an embodiment of the present invention.

Referring now to FIG. 2, shown is a flow diagram of a method for requesting frequency coordination in accordance with an embodiment of the present invention. Note that in FIG. 2, method 200 can be implemented within various logic of a processor, such a PCU logic or a dedicated uncore frequency control logic, which may be a standalone logic or can be incorporated into a PCU, in some implementations. As seen, method 200 begins by determining whether a processor activity level is greater than a threshold (diamond 210). As described above, various processor metrics can be analyzed to determine whether the processor frequency exceeds this activity level threshold. Although described in this embodiment with an activity level determination, in other embodiments a decision to undertake a frequency update within a multiprocessor system may instead be based on a measure of latency with regard to transactions between the processors. Still other detection mechanisms are possible in other embodiments to detect a situation in which a frequency update request is to be undertaken.

Referring still to FIG. 2, next at block 220 a frequency update request may be generated. This request can take different forms in various embodiments. For example, a request to update an uncore frequency can be generated, e.g., with a preprogrammed value for the updated uncore frequency. Or a calculation can be made. In yet other embodiments, a simple request to update frequency can be generated that in turn enables the receiving processor to perform a calculation as to an appropriate uncore frequency.

Still referring to FIG. 2, control passes next to block 230 where the frequency update request can be communicated to one or more processors coupled to the processor. As discussed above, this communication may be via a PtP interconnect that couples the processors such as a QPI or other interconnect. Different types of messages can be sent, including, in an embodiment, a frequency control message that includes an encoding for this requested operation as well as an identification of the requested updated frequency value. Although shown at this high level in the embodiment of FIG. 2, understand the scope of the present invention is not limited in this regard.

Figure 3:
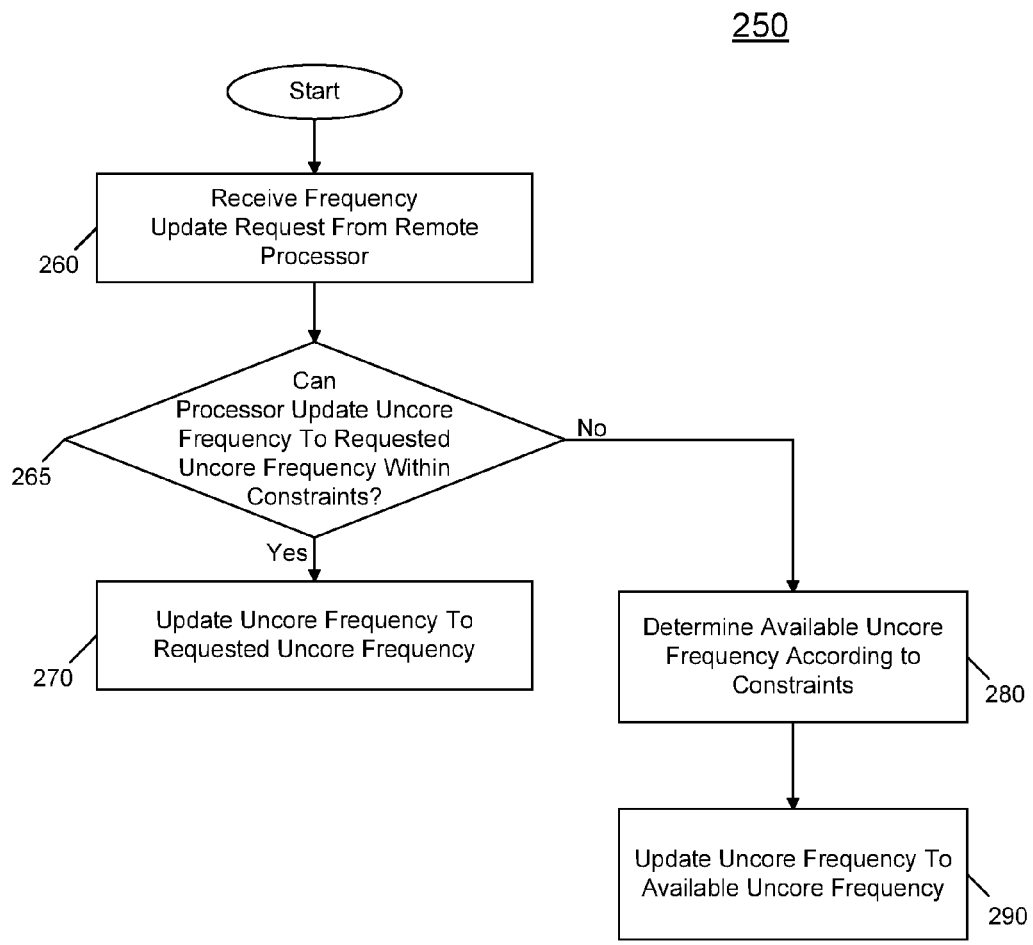
FIG. 3 is a flow diagram of a method for performing an uncore frequency update in accordance with an embodiment of the present invention.

Referring now to FIG. 3, shown is a flow diagram of a method for performing an uncore frequency update in accordance with an embodiment of the present invention. This method can be performed by uncore frequency control logic of a processor, as with the above discussion of FIG. 2, in some embodiments. However understand that this uncore frequency control logic that handles incoming requests for increased uncore frequency may be different than logic of a PCU that initiates a request to a remote processor for increased frequency within the remote processor. As seen, method 250 begins by receiving an uncore frequency request from a remote processor (block 260). As described above, this request can be received via a PtP interconnect and may include information such that the request can be directed to be received within the uncore frequency control logic. Note that this request may include a requested updated frequency or can simply be a request to update the uncore frequency. Next, control passes to diamond 265 where it can be determined whether the processor can update its uncore frequency to the requested uncore frequency, within various constraints of the processor. This determination may be made within the uncore frequency control logic, e.g., with input from a PCU that thus provides information regarding various constraints on the processor such as power and/or thermal constraints or the PCU may indicate whether an increased uncore frequency is allowed. In this way, the uncore frequency control logic can determine whether the requested uncore frequency (when the request includes a requested frequency value) can be effected. If so, control passes to block 270 where the uncore frequency can be updated to the requested uncore frequency. Thus this updated uncore frequency is at a greater value than a uncore frequency determined by the PCU for a current level of a workload being executed on the processor. Note here that this updated uncore frequency may be at a value higher (and potentially much higher) that a frequency needed to handle current activity of this local processor. Stated another way, this increased uncore frequency is to enable greater system performance overall, although it is not needed to handle the local processor workload.

Otherwise, if the processor cannot perform the update to the requested uncore frequency, control passes instead to block 280 where an available uncore frequency can be determined according to the processor constraints. The uncore frequency control logic can perform this determination or in some embodiments the PCU itself may make this determination. Finally, control passes to block 290 where the uncore frequency can be updated to the determined available uncore frequency. Although shown at this high level in the embodiment of FIG. 3, understand the scope of the present invention is not limited in this regard.

In some embodiments, a PCU in each processor observes local processor activity and signals via included uncore frequency control logic a request to reduce the latency and communicates this message to the other processor. For example, based on a local processor having high activity levels, the local PCU can communicate a message via a PtP interconnect (or interconnects) coupling it to other processors. When the other PCU receives such a message, it increases its uncore/interconnect frequency in order to reduce access latency from the initiating processor to internal caches and/or locally coupled memory to this remote socket.

Figure 4:
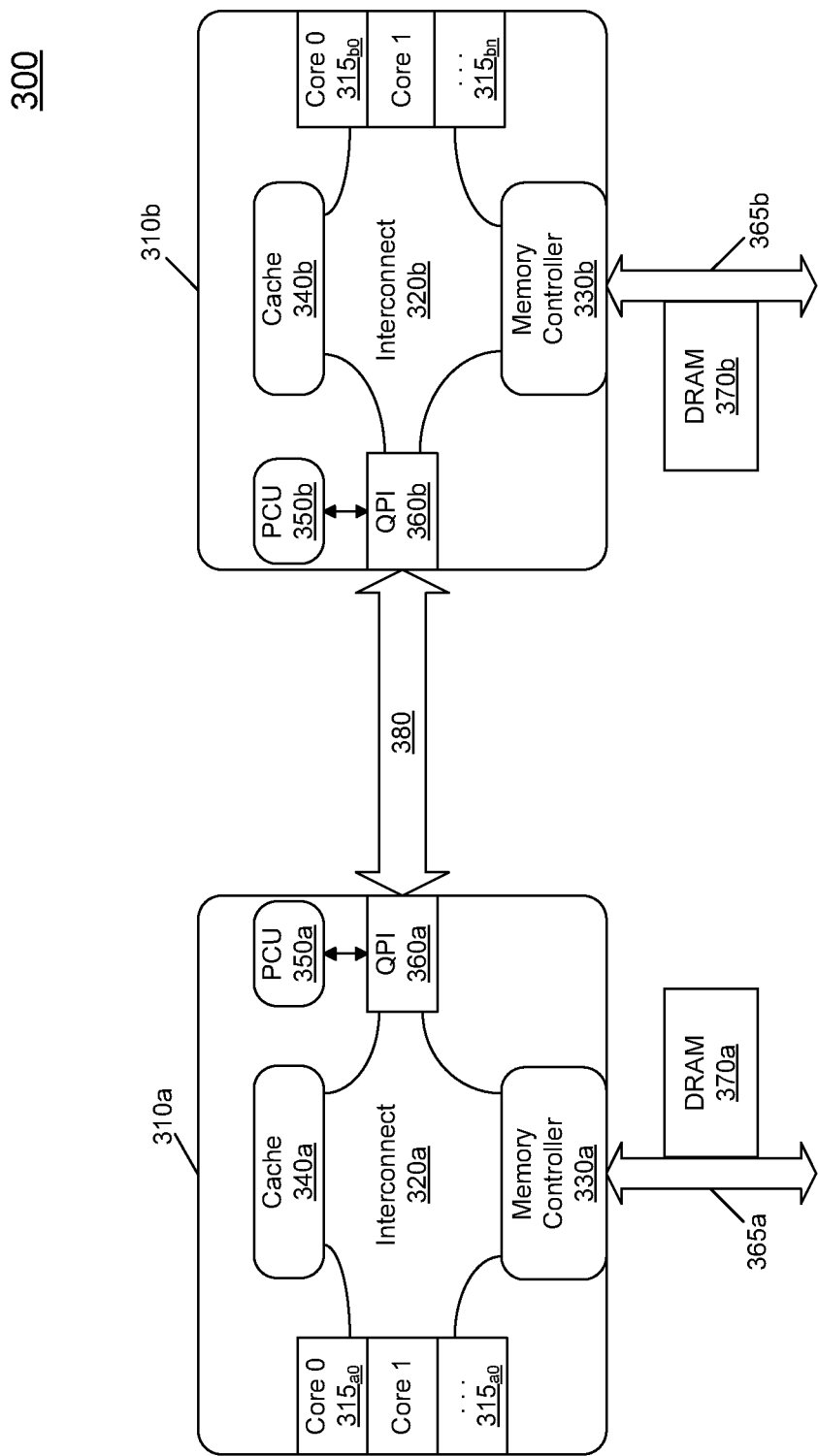
FIG. 4 is a block diagram of an example two processor system in accordance with an embodiment of the present invention.

Referring now to FIG. 4, shown is a block diagram of an example two processor system in accordance with an embodiment of the present invention. As shown in FIG. 4, system 300 is a multiprocessor system including a first processor socket $310_a$ and a second processor socket $310_b$. Each of the sockets may be configured the same and thus only the components of processor socket $310_a$ are discussed, although the same components are present in socket $310_b$. Of course in other embodiments, the processor sockets may be heterogeneous sockets in that different types of processors may be present, such as having different numbers of cores and other processing engines, differently sized cache memories, among other differences.

As seen, processor socket $310_a$ includes a plurality of cores $315_{a0}$-$315_{an}$ that couple to other components of the socket via an interconnect $320_a$ which in an embodiment can be a ring interconnect. Each of the cores may be of a common architecture or there can be cores of multiple micro-architectures. Each such core may include a local cache memory. In addition via interconnect $320_a$ the cores are coupled to a cache memory $340_a$ which in an embodiment is a shared cache memory such as a last level cache (LLC).

Also via interconnect $320_a$ the cores couple to a memory controller $330_a$ that in turn couples to a local portion of a system memory. More specifically, via a memory interconnect $365_a$, memory controller $330_a$ is coupled to and controls access to a dynamic random access memory (DRAM) $370_a$.

For purposes of discussion of embodiments herein, processor socket $310_a$ includes an interface $360_a$ which in an embodiment may be a QPI interface to provide interconnection between first processor socket $310_a$ and second processor socket $310_b$ via a QPI interconnect 380. As further shown, a PCU $350_a$ (which may include uncore frequency control logic as described herein) is coupled to interface 360 to enable communication of frequency control messages between the cores.

Note that embodiments scale to a system with more than two processors as well. In systems where not all processors are connected to each other (for example, where the processors are arranged as a ring, torus or other non-fully-connected topology), intermediate processors act as a local repeater for frequency coordination requests, so that each processor can receive frequency coordination requests from all other processors in the system. Using an embodiment of the present invention, improved power/performance in multiprocessor platforms when running low-bandwidth latency-sensitive server workloads may be realized.

Figure 5:
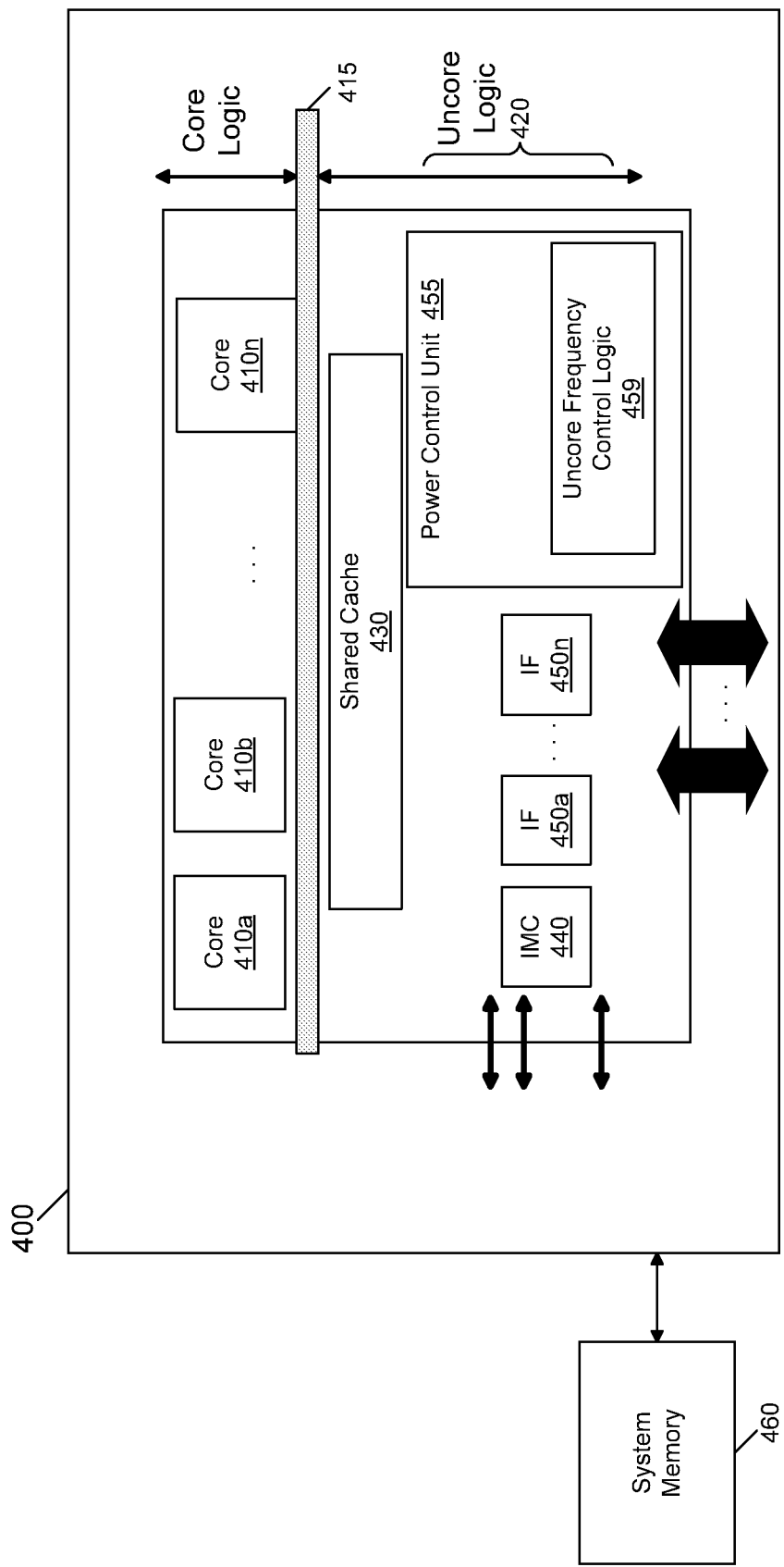
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a uncore frequency control logic 459 in accordance with an embodiment of the present invention. As described above, this logic acts to determine whether an update to a remote processor's uncore frequency is called for and if so to generate a request for an updated uncore frequency to be communicated to one or more remote processors. In addition this logic may perform calculations responsive to messages received from remote processor sockets to enable a coordinated uncore frequency to be generated and communicated to the other processor sockets. Still further, this logic can receive an incoming request for an uncore frequency update and determine whether the requested uncore frequency update is allowed and if so to effect the change, as described herein.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
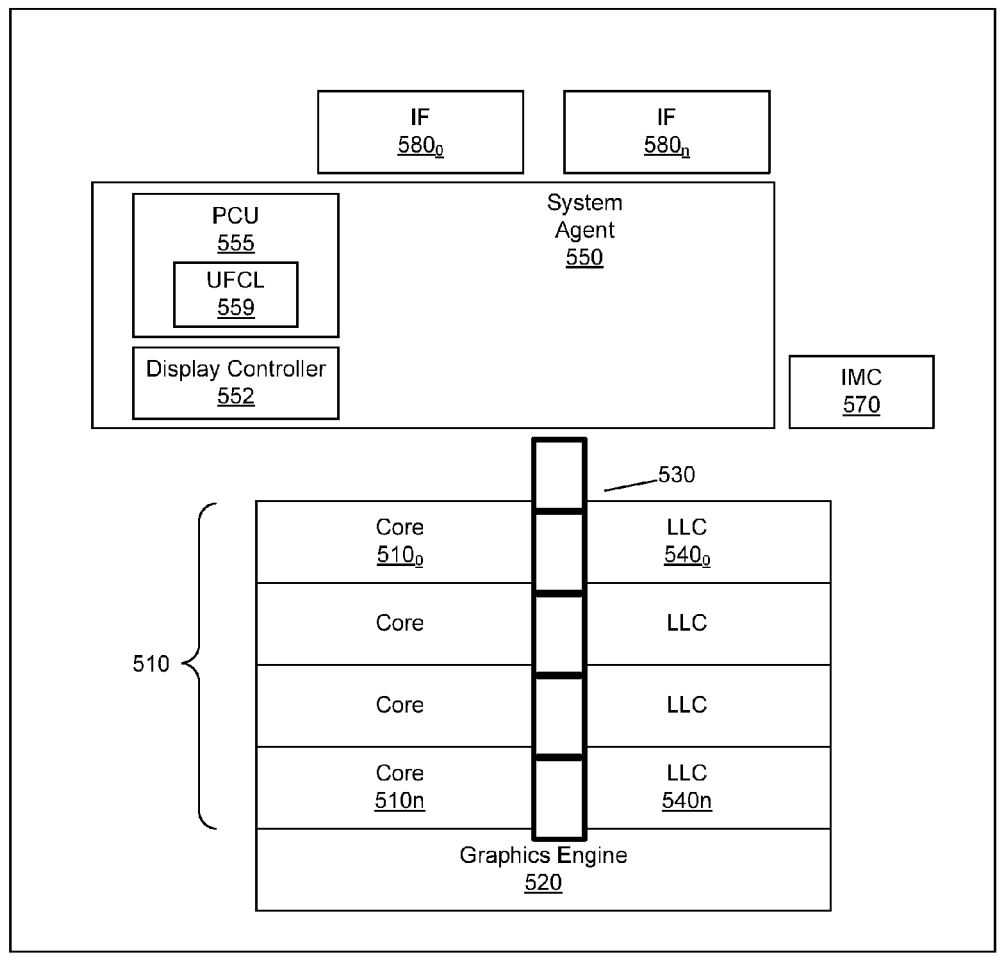
FIG. 6 is a block diagram of a processor in accordance with an embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an uncore frequency control logic 559 in accordance with an embodiment of the present invention to enable control and/or coordination of uncore frequency in multiple sockets of a multiprocessor system. In various embodiments, this logic may execute the algorithms described above in FIGS. 2 and 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
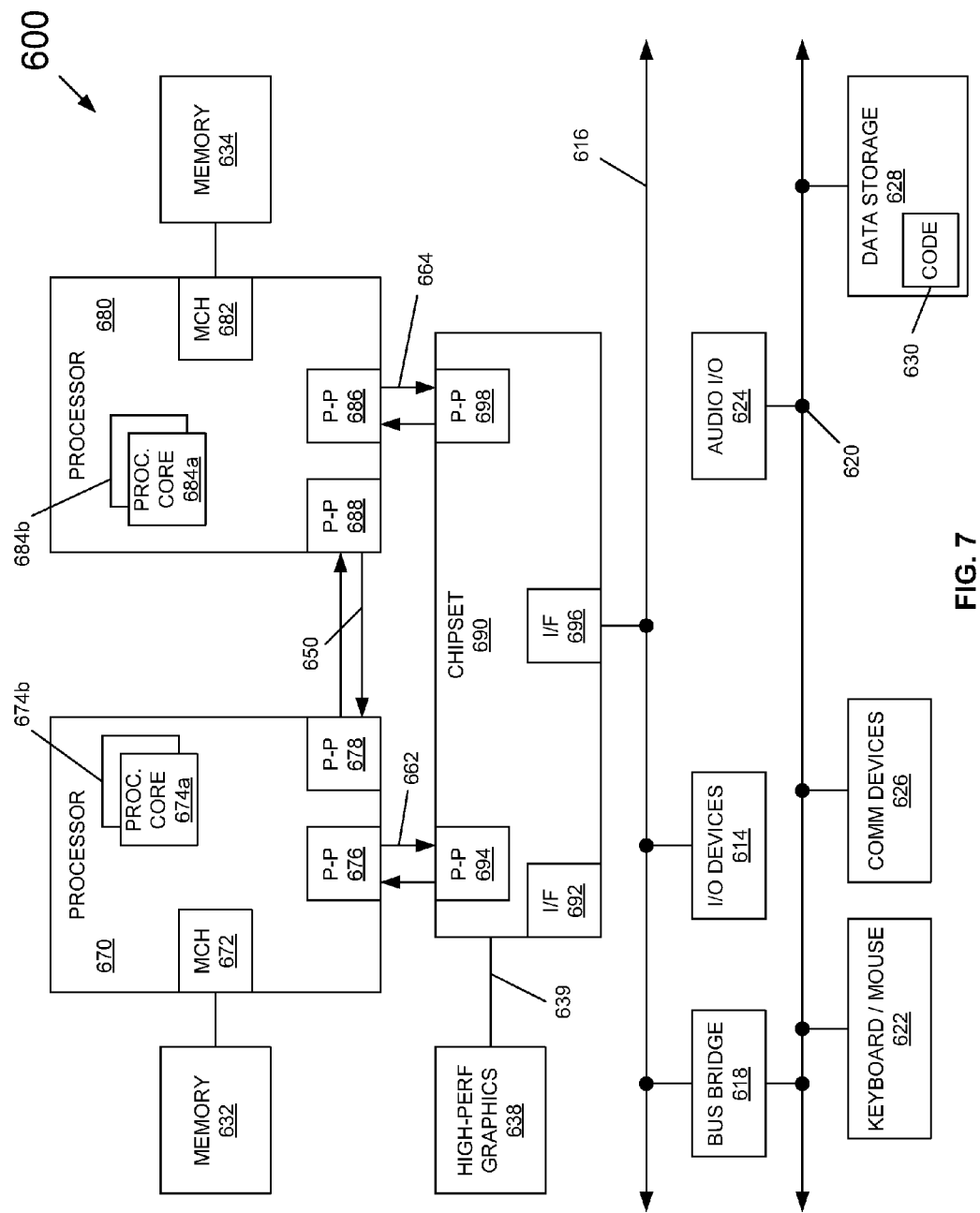
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform uncore frequency control and coordination, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one core to execute instructions;
uncore logic coupled to the at least one core;
a power controller coupled to the at least one core to control a power consumption level of the at least one core, the power controller to determine an activity level of the processor and responsive to the activity level, to generate a request for communication to a second processor to be coupled to the processor to request frequency coordination between the processor and the second processor when a number of cores of the processor having at least a first performance state exceeds a threshold number; and
a communication interface to communicate the request to the second processor.

2. The processor of claim 1, wherein the processor and the second processor are of a multiprocessor platform.

3. The processor of claim 1, wherein the power controller is to include a requested frequency value in the request, the requested frequency value corresponding to a requested uncore frequency for the second processor.

4. The processor of claim 3, wherein the power controller is to generate the request when a frequency of the at least one core exceeds a threshold frequency.

5. The processor of claim 1, wherein the processor further comprises an uncore frequency control logic to receive a frequency coordination request from the second processor and to update a frequency for the uncore logic responsive to the frequency coordination request.

6. The processor of claim 5, wherein the uncore frequency control logic is to calculate the frequency update based on at least one power constraint of the processor.

7. The processor of claim 5, wherein the uncore frequency control logic is to receive a plurality of frequency coordination requests each from another processor to couple to the processor and to select an updated frequency for the uncore logic corresponding to a frequency less than a maximum requested frequency of the plurality of frequency coordination requests by at least one bin frequency.

8. The processor of claim 5, wherein the uncore frequency control logic is to receive a plurality of frequency coordination requests each from another processor to couple to the processor, to determine an updated frequency for the uncore logic, and to communicate a second request including the updated frequency to each of the another processors, to cause each of the another processors to update a frequency for a corresponding uncore logic of the another processor.

9. The processor of claim 5, wherein the uncore frequency control logic is to update the uncore logic frequency to a value higher than a frequency determined by the power controller based on the activity level.

10. The processor of claim 1, wherein the power controller is to not generate the request when the activity level is less than a threshold.

11. A non-transitory machine-readable medium having stored thereon instructions, which if performed by a machine cause the machine to perform a method comprising:
receiving a plurality of frequency update requests in a first processor from a plurality of remote processors coupled to the first processor; and
updating a frequency of a first logic of the first processor responsive to the plurality of frequency update requests, wherein the updated frequency is at a value greater than a frequency determined by a power control unit (PCU)

of the first processor based on a workload being executed by the first processor, the updated frequency less than a maximum requested frequency of the plurality of frequency update requests by at least one bin frequency.

12. The non-transitory machine-readable medium of claim 11, wherein the method further comprises updating the frequency to a requested frequency of one of the plurality of frequency update requests if execution of the first logic at the requested frequency is within constraints, and if not determining an available updated frequency according to the constraints.

13. The non-transitory machine-readable medium of claim 12, wherein the method further comprises updating the frequency of the first logic to the available updated frequency, wherein the available updated frequency is at the value greater than the determined frequency.

14. The non-transitory machine-readable medium of claim 11, wherein the method further comprises determining if an activity level of the first processor is greater than a threshold, and if so generating a second frequency update request.

15. The non-transitory machine-readable medium of claim 14, wherein the method further comprises communicating the second frequency update request to one or more processors coupled to the first processor.

16. A system comprising:
a first processor including at least one core to execute instructions, uncore logic coupled to the at least one core, a power control unit (PCU) coupled to the at least one core to control a power consumption level of the at least one core, the PCU including an uncore frequency control logic to receive a frequency coordination request from a second processor and to update a frequency for the uncore logic responsive to the frequency coordination request to a higher frequency than a frequency determined by the PCU responsive to an activity level of the first processor, and a communication interface to receive the frequency coordination request from the second processor via an interconnect;
the second processor coupled to the first processor via the interconnect and including a second uncore logic, a second core and a power controller coupled to the second core to control a power consumption level of the second core, the power controller to determine an activity level of the second processor and responsive to the activity level, to generate the frequency coordination request; and
a dynamic random access memory (DRAM) coupled to the first processor and the second processor.

17. The system of claim 16, wherein the uncore frequency control logic is to determine the activity level of the first processor and responsive to the activity level, to generate a request for communication to the second processor to request frequency coordination between the first processor and the second processor.

18. The system of claim 16, wherein the power controller is to generate the frequency coordination request when a number of cores of the second processor having at least a first performance state exceeds a threshold number, and to not generate the frequency coordination request when the number of cores does not exceed the threshold.

19. The system of claim 16, wherein the second processor is to receive a plurality of frequency coordination requests each from a processor coupled to the second processor and to select an updated frequency corresponding to a frequency less than a maximum requested frequency of the plurality of frequency coordination requests by at least one bin frequency, and to communicate the selected updated frequency to each of the processors.

* * * * *